United States Patent [19]

Kehl et al.

[11] 4,052,544
[45] Oct. 4, 1977

[54] ETHYLENE POLYMERIZATION CATALYSTS

[75] Inventors: William L. Kehl, Pittsburgh, Pa.; Thomas J. Lynch, Orange, Tex.

[73] Assignee: Gulf Oil Corporation, Pittsburgh, Pa.

[21] Appl. No.: 702,565

[22] Filed: July 6, 1976

[51] Int. Cl.$^2$ .......................... C08F 4/02; C08F 4/12; C08F 4/24; C08F 10/00
[52] U.S. Cl. .................... 526/102; 252/428; 252/467; 526/106; 526/120
[58] Field of Search ............... 252/428, 467; 526/102, 526/106, 120

[56] References Cited

U.S. PATENT DOCUMENTS

| | | | |
|---|---|---|---|
| 2,825,721 | 3/1958 | Hogan et al. | 526/102 |
| 2,930,789 | 3/1960 | Kerber et al. | 526/106 |
| 2,959,577 | 11/1960 | Hogan | 526/106 |
| 3,196,139 | 7/1965 | Best | 526/102 |

*Primary Examiner*—Alan Holler
*Attorney, Agent, or Firm*—Richard L. Kelly

[57] ABSTRACT

Novel catalysts are provided for the polymerization of olefins such as ethylene. The catalysts consist essentially of a chromium compound supported upon an inorganic carrier containing aluminum and arsenate moieties. The inorganic carrier is an amorphous precipitate of aluminum arsenate, or an amorphous coprecipitate containing aluminum and arsenate moieties in proportions such that the aluminum and arsenic are present in an atomic ratio in the range of 5:1 to 1:1. The catalysts are particularly useful for polymerizng ethylene in a Particle Form Process in that the catalysts have essentially no induction period and provide ethylene polymers having a desirably-broad molecular weight distribution and a desirably-high melt flow shear ratio.

7 Claims, No Drawings

ETHYLENE POLYMERIZATION CATALYSTS

BACKGROUND OF THE INVENTION

One of the principal commercial processes employed to manufacture high density linear ethylene polymers is to polymerize ethylene in the presence of a chromium oxide catalyst supported on silica. While the catalysts employed in this process are characterized as being a chromium oxide supported on silica, it is believed that the chromium undergoes at least partial reaction with silicon atoms to form complex molecules whose precise chemical composition has not been established with certainty. It is believed that at least a portion of the chromium is present in the hexavalent state.

In a specific aspect of this process, the polymerization is carried out in a hydrocarbon medium having little or no solvent action on the resin being produced and the resin, as formed, precipitates as fine solid particles. For this reason, this particular process is known in the art as the Particle Form Process. As used throughout this specification, the term Particle Form Process will be restricted to a process carried out in the presence of a chromium oxide catalyst and carried out in a hydrocarbon medium having solubility characteristics such that the resin, as produced, precipitates in the form of fine solid particles.

One of the limitations of the Particle Form Process is that the resins produced by the process have a relatively narrow molecular weight distribution, and a relatively low melt flow shear ratio which conventionally is expressed as the ratio obtained by dividing the high load melt index (ASTM 1238-70, Condition F) by the normal load melt index (ADTM 1238-70, Condition E). For a number of industrial purposes, it is desirable to have available high density linear ethylene polymers having broad molecular weight distributions and high melt flow shear ratios.

Many workers have attempted to modify the Particle Form Process to expand its capability to manufacture ethylene polymers having broader molecular distributions and higher melt flow shear ratios. Such efforts have been directed principally to modifying the chromium oxide-supported catalysts employed in the process. The success of such efforts has been marginal, at best, and many workers in the art believe that the Particle Form Process inherently is restricted to the manufacture of ethylene polymers having narrow molecular weight distributions and low melt flow shear ratios.

SUMMARY OF THE INVENTION

In accordance with the present invention, the applicants have discovered a novel class of catalysts useful in the polymerization of olefins such as ethylene. The catalysts are prepared by depositing a chromium compound upon an inorganic carrier containing aluminum and arsenate moieties and activating the catalyst by heating the material to a temperature of at least about 350° C. The inorganic carrier is selected from the group consisting of:

a. an amorphous precipitate of aluminum arsenate,
b. an amorphous coprecipitate containing aluminum and arsenate moieties in proportions such that the aluminum and arsenic are present in an atomic ratio of 5:1 to 1:1, and
c. mixtures of (a) and (b).

Such carriers are prepared by neutralizing a strongly acidic aqueous solution containing aluminum and arsenic ions in an atomic ratio of 5:1 to 1:1 to form a solid precipitate containing aluminum and arsenate moieties.

These catalysts, when employed to initiate the polymerization of ethylene in the Particle Form Process, have no observable induction period and provide ethylene polymers of significantly broader weight distributions and significantly higher melt flow shear ratios than are obtained in the Particle Form Process with prior art catalysts.

DETAILED DESCRIPTION OF THE INVENTION

In accordance with the present invention, the applicants provide their novel polymerization catalyst by depositing a chromium compound on a particular type of carrier or support and activating the catalyst by heating the material to a temperature of at least about 350° C. For reasons which will be developed, the catalysts of the invention differ significantly from the supported chromium oxide polymerization catalysts of the prior art, both with respect to chemical structure and catalytic activity.

The catalysts, when prepared in accordance with the preferred methods hereinafter described, contain a substantial portion of their chromium content in an oxidation state of less than 6. This is evidenced by the fact that the preferred catalysts have a green color as distinguished from the brown to orange color of hexavalent chromium compounds. This is true even if the chromium compound employed in the catalyst preparation is in the hexavalent state. It is known that $CrO_3$, when heated to about 250° C., will generally be converted to $Cr_2O_3$ and liberate oxygen. As will be subsequently demonstrated, the catalysts of the invention, when employed in the Particle Form Process, have no observable induction period.

The carriers or supports for the catalysts of the invention may be of two related types that are generally functionally equivalent in the practice of the invention. The first type is an amorphous precipitate of aluminum arsenate. The second type is an amorphous coprecipitate containing aluminum and arsenate moieties with the aluminum arsenic atoms being present in an atomic ratio in the range of about 5:1 to 1:1 and preferably in the range of about 3:1 to 1:1.

Amorphous precipitates of aluminum arsenate are known in the art. These precipitates are prepared by neutralization of a strongly acidic aqueous medium containing aluminum and arsenic ions, the ions being present in quantities containing equal numbers of aluminum and arsenic atoms. Such acid solutions are prepared by dissolving in water a highly soluble aluminum salt and a source of arsenic ions, usually arsenic trioxide. The aluminum salt employed is not critical, provided only that it does not contain an ion which will form a precipitate in the subsequent precipitation step. Aluminum nitrate and aluminum halides, particularly aluminum chloride, are the aluminum salts of choice for use in the invention. Arsenic trioxide is preferably employed as the source of the arsenic ions, although other water-soluble arsenic oxides and salts can be employed if desired.

The amorphous aluminum arsenate precipitate is prepared by neutralizing the acidic medium containing the aluminum and arsenic ions. When the pH is increased to 6 or higher, the aluminum and arsenate moieties precipitate from the aqueous medium. While in theory the neutralization can be carried out by mixing the acidic solution with an appropriate alkali in any manner, it is preferred to simultaneously add the acidic medium and the neutralizing alkali to a stirred aqueous medium. The two solutions should be added at controlled rates so that the pH is continuously maintained at a preselected pH in the range of about 6.0 – 10.0. While a wide variety of bases can be used to neutralize the acidic medium, it is preferred to use ammonium hydroxide or an ammonium salt such as ammonium carbonate so that the aluminum arsenate precipitate will be free of metallic ions that might be incorporated into the precipitate, if inorganic bases such as sodium carbonate or sodium hydroxide were used in the process. While the precipitation reaction can be carried out over a wide range of temperatures, ambient temperature usually is employed as no significant advantages are obtained by heating or cooling.

After the precipitation is completed, the precipitate is filtered, washed one or more times to free the precipitate of occluded ions, and dried. Thereafter, the precipitate is calcined in a conventional manner at a suitable temperature, typically in a range of about 125°–500° C.

The calcined aluminum arsenate product is amorphous, has a bulk density in the range of about 0.25 to 0.5 grams/cm$^3$, and has the appearance of a compacted mass of spherical granules having a diameter in the 100–500 micron range.

The second type of carrier for the catalysts of the invention consists of amorphous coprecipitates containing aluminum and arsenate moieties in which the aluminum and arsenic atoms are present in an atomic ratio within the range previously described. While it is possible to prepare coprecipitates having an aluminum/arsenic atomic ratio of greater than 5:1, the ultimate chromium containing catalyst prepared therefrom give polymerization rates lower than desired in commercial practice.

The aluminum arsenate containing coprecipitates are prepared by the same procedures employed to prepare the aluminum arsenate precipitates, except that the ratio of aluminum and arsenic atoms is adjusted to provide an atomic ratio from about 5:1 to substantially 1:1, and preferably a range from about 3.5:1 to about 1.2:1.

In physical appearance and gross physical properties, the calcined amorphous aluminum arsenate containing coprecipitates are virtually indistinguishable from the calcined amorphous aluminum arsenate precipitates previously described.

As certain aluminum salts, arsenic trioxide, and ammonium hydroxide are soluble in certain polar solvents such as methanol, it is possible to prepare the previously described inorganic carriers by carrying out the indicated synthesis steps in such polar solvents or in mixtures of water and such polar solvents.

The catalysts of the invention are prepared by depositing a chromium compound on a carrier or support of the type previously described. The concentration of the chromium compound deposited upon the carrier is not critical, but ordinarily will be in the range of about 0.1 – 4.0% and preferably in the range of 0.2 – 2.0%, expressed as free chromium. Thereafter, the catalysts are activated by being heated as subsequently described.

The chromium may be deposited on the carrier in almost any chemical form such as the oxide or a salt such as chromium chloride, chromium nitrate, chromium acetate, and the like. Upon being heated in the activation step, the chromium is probably converted to a different chemical form. The precise chemical form in which the chromium exists after activation is not known with certainty, but it may exist as an oxide or an arsenate or may be incorporated into the structure of the support.

In one embodiment of the invention, the catalyts are prepared by depositing chromium oxide on the carrier. This can be done by simply admixing appropriate quantities of anhydrous chromium oxide and the carrier and tumbling the materials together in a suitable vessel at an elevated temperature under reduced pressure. Under these conditions, the chromium oxide deposits itself substantially uniformly over the entire surface of the carrier.

In another embodiment of the invention, the chromium oxide or a water soluble chromium salt in an appropriate quantity may be admixed with the aqueous slurry of the carrier as it is prepared. Thereafter, the slurry may be dried in any desired manner. One of the preferred methods for preparing the catalysts is to add the chromium compound to the aqueous slurry of the carrier and to then spray dry the slurry. This spray drying technique has the advantage that the catalyst is recovered with a particle size distribution that is convenient for use in the polymerization of ethylene. Typically, the catalyst prepared by the spray drying technique will have particle sizes in the range of about 50 – 150 microns. Particles outside of this desired range can be removed by screening, but proper spray drying techniques can largely eliminate any need for screening.

The catalysts prepared as described above will be activated by being heated to an elevated temperature in the range of about 350° – 950° C. and preferably in the range of about 700° – 850° C. The activation is conveniently carried out by the same techniques employed to activate the prior art catalysts previously described, as by being suspended and fluidized in a stream of heated oxygen containing gas. While the activation will normally be carried out in an oxygen-containing gas, the presence of oxygen is not required to provide highly active catalysts.

In yet another embodiment of the invention, a water-soluble chromium compound will be incorporated into the acidic solution employed to prepare the aluminum-arsenate containing carrier. The precipitation of the aluminum and arsenate moieties also precipitates the chromium compound which becomes intimately admixed with the aluminum and arsenate moieties. When this carrier is heated to the activation temperatures previously described, highly active catalysts are obtained.

As earlier noted herein, the preferred catalysts of the invention have a substantial portion of the chromium compound in a valence state of less than 6. This presents no problems so long as appropriate control of temperature is maintained. At temperatures above about 250° C. the hexavalent chromium oxides decompose with the liberation of oxygen. When temperatures above the range specified above are employed, however, for reasons which are not fully understood, there is a tendency to form hexavalent chromium compounds, their presence being indicated by the traditional brown to orange color of hexavalent chromium oxides.

While the polymerization catalysts of this invention are employed in the conventional manner in the polymerization of ethylene, unexpected benefits are obtained by use of the catalysts of the invention. Specifically, when the catalysts of the invention are employed in the polymerization of the ethylene by the Particle Form Process, no observable induction period is encountered. By contrast, the prior art catalysts in which chromium oxide is deposited on silica have a substantial induction period. Moreover, the ethylene polymers produced by the use of the catalysts of the invention in the Particle Form Process provide ethylene polymers having desirably broad molecular weight distributions and desirably high melt flow shear ratios.

The catalysts of the invention also can be employed to polymerize ethylene in a nonsolvent, gas phase, fluidized bed process.

The following examples are set forth to illustrate more clearly the principle and practice of this invention to those skilled in the art. Where references are made to percentages and parts, such percentages and parts are expressed on a weight basis unless otherwise indicated.

EXAMPLE 1

This example will illustrate a precedure for the preparation of a calcined amorphous aluminum arsenate precipitate.

Prepare a strongly acidic solution containing aluminum and arsenic ions in an equal molar ratio by dissolving 0.5 gram - mol of arsenic trioxide and 1 gram - mol of aluminum chloride in 3 liters of distilled water. Prepare a second solution by diluting 300 ml of concentrated 28% ammonium hydroxide with 300 ml of distilled water. This solution will contain approximately 2.4 mols of ammonium hydroxide.

Charge a stirred reaction vessel with 1000 ml of distilled water. Add to this distilled water the previously described acidic solution at a rate of approximately 100 ml per minute. Add the ammonium hydroxide solution simultaneously at a rate sufficient to maintain the pH of the stirred reaction mixture at a constant value of 8.0. After the addition of the acidic solution is completed, stir the reaction mixture for an additional half hour. Filter the precipitated aluminum arsenate, wash with 3000 ml of distilled water and dry overnight at 120° C. Calcine the oven-dried granular material for 5 hours in air at 500° C. in a muffle furnace.

EXAMPLE 2

This example will illustrate the preparation of a calcined amorphous aluminum arsenate containing coprecipitate having an aluminum-arsenic atomic ratio of 2:1. The precipitate will be made in the identical manner set forth in Example 1, except that the acidic solution will be prepared by dissolving 2gram-mols of aluminum nitrate in the 5 liters of distilled water before adding 0.5 gram-mol of arsenic trioxide.

Examples 1 and 2 illustrate the preparation of the aluminum arsenate supports for the catalysts of the invention. The catalysts of the invention are prepared by impregnating such supports with an appropriate chromium compound and activating the catalyst by heat.

One method of preparing the catalyst is to first calcine the support, impregnate the support with chromium oxide, and then activate the catalyst by fluidizing the catalyst in stream of heated dry air. A typical procedure is illustrated in Example 3 below.

EXAMPLE 3

Charge a 1-liter round bottom flask with 2 parts of chromium trioxide and 98 parts of a calcined amorphous aluminum arsenate prepared as in Example 1. Attach the charged round bottom flask to a Buchi Rotovapor. Reduce the pressure within the Rotovapor apparatus to 12 kilopascals (approximately 0.12 atmosphere) and raise the temperature to 70° C. Maintain at this temperature for 1 hour and then raise the temperature to 120° C. At the end of the second hour, lower the pressure to 8 kilopascals (approximately 0.08 atmosphere) and increase the temperature to 170° C. At the end of the third hour, increase the temperature to 180° C. At the end of the fourth hour, lower the pressure to 0.4 kilopascal (approximately 0.004 atmosphere) and raise the temperature to 205° C. Continue heating for an additional three hours under these conditions. Cool the catalyst to ambient temperature and bleed air into the Rotovapor apparatus to bring the pressure back to atmospheric pressure. The product will be orange-brown in color.

Activate the catalyst by heating to 760° C. for a period of 5 hours while maintaining the catalyst in a fluidized condition by the passage of air through the fluidized bed. The finished catalyst will be green in color.

Another method of preparing the catalysts of the invention is to impregnate the carrier with the chromium compound before the carrier is dried. The drying may be carried out in any manner as by simply heating in an oven, removing the residual water by mixing with an azeotroping solvent such as ethanol and distilling off the water as an azeotrope, or, preferably, by spray drying. The catalyst is activated as perviously described.

The catalysts of the invention were evaluated in a standardized Particle Form Process that was run on a batch basis. In this standardized method a stirred polymerization reaction vessel was maintained in a heated jacket maintained at a temperature of about 110° C. The polymerization vessel was charged with the catalyst to be evaluated. A small quantity of dry, oxygen-free isobutane then was charged to the reactor, allowed to vaporize, and vented from the reactor to remove all traces of oxygen from the reactor. The reactor then was charged with 500 parts of isobutane and attached to a reservoir of polymerization grade ethylene gas maintained at a pressure of 3.5 megapascals (approximately 35 atmospheres). The reactor was in continuous open communication with the reservoir of ethylene gas with a flow meter being maintained in the ethylene line to measure the flow of gas to the reactor. During the charging period, the temperature of the vessel fell below 110° C. but normally the temperature was reestablished at about 110° C. within a few minutes after the isobutane was charged to the reactor.

With the catalysts of the invention, polymerization started almost immediately with no observable induction period.* Each polymerization was was run for 90 minutes and the flow meter was read at 10-minute intervals to determine if there was any change in the rate of polymerization with time over the 90-minute period of the polymerization. At the end of the 90-minute period, the flow of the ethylene gas was discontinued, the reactor was vented, and the polyethylene was recovered and weighed.

With a commercial grade chromium oxide catalyst supported on silica, induction periods of up to 50 minutes are frequently observed.

EXAMPLE 4

A polymerization was run employing as a catalyst an aluminum arsenate carrier that had been prepared by the procedure described in Example 1. The catalyst was impregnated with chromium trioxide as described in Example 3, the quantity of chromium oxide being sufficient to provide 6.3 grams of chromium per kilogram of finished catalyst. The catalyst was activated at 500° C. No induction was noted and ethylene polymer was produced at a rate of 48 grams per gram of catalyst per hour.

Ethylene polymers produced in a Particle Form Process employing the catalysts of the present invention differ in important respects from corresponding ethylene polymers produced under identical polymerization conditions with commercial chromium oxide catalysts supported on silica. Specifically, while the ethylene polymers made with the catalysts of the invention have molecular weights substantially identical to ethylene polymers made with prior art chromium oxide on silica catalysts, the ethylene polymers produced by the invention, have substantially different processing characteristics. Specifically, with the ethylene polymers made with the catalysts of the invention, the change of melt viscosity with applied shear rate is much greater than is observed with ethylene polymers made with prior art chromium-oxide on silica catalysts. The signficance of this fact is that high molecular weight ethylene polymers made with the catalysts of the invention can be extruded in conventional extruders by carrying out the extrusion at high applied shear rates. By contrast, ethylene polymers of comparable molecular weight simply cannot be extruded in conventional extruders. The difficulties in extruding the prior art high molecular weight ethylene polymers are discussed by L. V. Cancio and R. S. Joyner in their papers GAINS ARE MADE IN EXTRUDING HMW PE POWDERS, *Plastics Technology*, February 1975, pp. 40–44.

EXAMPLE 5

The melt flow characteristics of two resins were determined at 190° C. in a rheometer. The ethylene polymer of the invention was prepared in Example 4. A commercially available prior art ethylene polymer was employed for comparison purposes. The polymer selected for this purpose had a molecular weight similar to that of the experimental resin.

The approximate normal load melt index (ASTM 1238-70 Condition E) and the approximate high load melt index (ASTM 1238-70 Condition F) of the two polymers were calculated from the melt flow data. The HLMI/LLMI ratio for the prior art polymer was approximately 100. The corresponding ratio for the polymer made with catalyst of the present invention was approximately 440. The higher HLMI/LLMI ratio indicates that the catalysts of the invention provide ethylene polymers which have a broad molecular weight distribution, which polymers inherently have superior processing characteristics.

The above descriptions and particularly the examples are set forth for purposes of illustration only. Many variations and modifications thereof will be apparent to those skilled in the art and can be made without departing from the spirit and scope of the invention herein described.

We claim:

1. A process for preparing an olefin polymerization catalyst which consists essentially of depositing a chromium compound upon an inorganic carrier containing aluminum and arsenate moieties and activating the catalyst by heating the material to a temperature of at least about 350° C., the inorganic carrier being selected from the group consisting of:
   a. an amorphous precipitate of aluminum arsenate,
   b. an amorphous coprecipitate containing aluminum and arsenate moieties in proportions such that the aluminum and arsenic are present in an atomic ratio of between 5:1 and 1:1, and
   c. mixtures of (a) and (b);

said carrier having been prepared by neutralizing a strongly acidic solution containing aluminum and arsenic ions in proportions such that the aluminum and arsenic are present in an atomic ratio in the range of 5:1 to 1:1 to form a solid precipitate containing aluminum and arsenate moieties, and recovering the precipitate.

2. The process of claim 1 in which the catalyst is activated by being heated in the presence of an oxygen-containing gas.

3. The process of claim 1 in which the catalyst is activated by being heated to a temperature in the range of about 350°–950° C.

4. The process of claim 1 which includes the steps of:
   a. preparing an aqueous slurry of the inorganic carrier by neutralizng an acidic aqueous solution containing aluminum and arsenic ions,
   b. admixing an inorganic chromium compound with the slurry of (a) to provide about 0.2 – 4.0% by weight chromium based on the total solids,
   c. spray drying the slurry of (b), and
   d. activating the dry catalyst of (c) by heating to a temperature of about 350° – 950° C.

5. The process of claim 1 which includes the steps of:
   a. preparing an aqueous solution containing chromium ions in addition to aluminum and arsenic ions,
   b. precipitating an inorganic material containing aluminum, arsenic and chromium moieties by neutralizing the acidic solution of (a),
   c. drying the precipitate of (b), and
   d. activating the dry catalyst of (c) by heating to a temperature of about 350° – 950° C.;

the chromium added in step (a) being sufficient to constitute about 0.2 – 4.0% by weight of the precipitate of step (b).

6. An olefin polymerization catalyst prepared by the method of claim 1.

7. In a Particle Form Process for the polymerization of ethylene; the improvement which comprises employing the olefin polymerization catalyst of claim 6 to initiate the polymerization of the ethylene.

* * * * *